United States Patent
Obata et al.

(10) Patent No.: US 9,920,405 B2
(45) Date of Patent: Mar. 20, 2018

(54) SURFACE-TREATED COMPONENT MANUFACTURING METHOD AND APPARATUS

(71) Applicant: HITACHI AUTOMOTIVE SYSTEMS, LTD., Ibaraki (JP)

(72) Inventors: Ryoju Obata, Fukushima (JP);
Yoshihiro Funayama, Fukushima (JP);
Tatsuya Yahagi, Fukushima (JP);
Masahiro Yamada, Fukushima (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 28 days.

(21) Appl. No.: 14/619,378

(22) Filed: Feb. 11, 2015

(65) Prior Publication Data

US 2015/0247222 A1    Sep. 3, 2015

(30) Foreign Application Priority Data

Feb. 28, 2014    (JP) .................................. 2014-038852

(51) Int. Cl.
*C22C 38/00* (2006.01)
*C21D 1/18* (2006.01)
(Continued)

(52) U.S. Cl.
CPC ................ *C22C 38/00* (2013.01); *C21D 1/18* (2013.01); *C21D 1/62* (2013.01); *C21D 6/00* (2013.01);
(Continued)

(58) Field of Classification Search
CPC .......... C21D 11/005; C21D 1/18; C21D 1/62; C21D 6/00; C21D 8/065; C21D 9/0075;
(Continued)

(56) References Cited

U.S. PATENT DOCUMENTS 3,610,861 A * 10/1971 Storey ...................... H05B 6/06
219/637
3,614,366 A * 10/1971 Huchok ............... C21D 9/0075
219/650

(Continued)

FOREIGN PATENT DOCUMENTS

CN          102909531        * 11/2012
JP          2013-209709        10/2013

*Primary Examiner* — Colleen P Dunn
*Assistant Examiner* — Nicholas A Wang
(74) *Attorney, Agent, or Firm* — Wenderoth, Lind & Ponack, L.L.P.

(57) ABSTRACT

A surface-treated component manufacturing method and apparatus capable of detecting an end of a steel bar. Quenching (surface treatment) is locally applied to a plurality of steel bars aligned end-to-end in an axial direction while moving the steel bars in the axial direction. Quenched portions are locally formed on each of the steel bars through a moving step, a detecting step, and a quenching step. In the detecting step, an end portion of one steel bar is displaced relative to an end portion of another steel bar with a pressure roller device, and passage of the end of the one or another steel bar is detected with a detection sensor. In the quenching step, the quenched portions are locally formed on each of the steel bars with a quenching device at a quenching timing determined on the basis of the result of detection by the detection sensor.

7 Claims, 7 Drawing Sheets

(51) Int. Cl.
*C21D 1/62* (2006.01)
*C21D 6/00* (2006.01)
*C21D 8/06* (2006.01)
*C21D 9/00* (2006.01)
*C21D 11/00* (2006.01)
*F16F 9/32* (2006.01)

(52) U.S. Cl.
CPC ........... *C21D 8/065* (2013.01); *C21D 9/0075* (2013.01); *C21D 11/005* (2013.01); *F16F 9/3221* (2013.01); *F16F 2226/02* (2013.01)

(58) Field of Classification Search
CPC ..... C22C 38/00; F16F 2226/02; F16F 9/3221; B07C 5/34; B29D 2030/0066
See application file for complete search history.

(56) References Cited

U.S. PATENT DOCUMENTS

| | | | | |
|---|---|---|---|---|
| 4,575,052 A * | 3/1986 | Ebata | ........................ | C21D 1/62 |
| | | | | 266/114 |
| 5,902,423 A * | 5/1999 | Pugh | ........................ | B02C 17/20 |
| | | | | 148/333 |
| 2009/0200713 A1* | 8/2009 | Koeck | .................... | B21B 43/003 |
| | | | | 266/44 |
| 2013/0260167 A1* | 10/2013 | Kobayashi | ............ | F16F 9/3207 |
| | | | | 428/586 |

* cited by examiner

SURFACE-TREATED COMPONENT MANUFACTURING METHOD AND APPARATUS

BACKGROUND OF THE INVENTION

The present invention relates to a surface-treated component manufacturing method and apparatus for locally surface-treating steel bars (including hollow and solid steel bars), for example, rods of cylinder devices such as hydraulic cylinders and hydraulic shock absorbers.

A hydraulic shock absorber as a cylinder device provided in a traveling device, e.g. an automobile, substantially comprises a cylinder incorporating a piston, and a rod connected at one end thereof to the piston in the cylinder and retractably projecting at the other end thereof from the cylinder through a rod guide.

The rod has an annular stopper (rebound stopper) attached to the outer periphery of an axially intermediate portion thereof. The stopper abuts against the rod guide when the rod is extended, thereby defining the most extended position of the rod. The stopper is secured to the rod by what is called metal flow joining. That is, a full-circumferential groove is formed on the outer peripheral surface of the rod, and a part of the stopper is pushed into the full-circumferential groove through plastic deformation.

In the process of manufacturing such a rod, a steel bar (steel base material) as a blank (material) for a rod is locally quenched. That is, a steel bar is locally quenched to form quenched portions in regions other than those to be subjected to plastic working or cutting, e.g. both ends of the steel bar and a region where a full-circumferential groove is to be formed (for example, see Japanese Patent Laid-Open Publication No. 2013-209709).

SUMMARY OF THE INVENTION

When a steel bar is to be locally subjected to surface treatment, e.g. quenching, it is necessary to detect a position on the steel bar in order to distinguish regions of the steel bar that are to be subjected to surface treatment from those to which no surface treatment is to be applied. Particularly, when surface treatment is to be locally applied to a plurality of steel bars axially aligned end-to-end while axially moving the steel bars in order to improve productivity, it is desirable to be capable of surely detecting an end (end portion or end face) of a steel bar that defines the boundary between a pair of steel bars axially adjacent to each other, for example.

The present invention has been made in view of the above-described problem of the background art. Accordingly, an object of the present invention is to provide a surface-treated component manufacturing method and apparatus capable of surely detecting an end (end portion or end face) of a steel bar and hence capable of improving productivity.

To solve the above-described problem, the present invention provides a surface-treated component manufacturing method of locally treating respective surfaces of a plurality of steel bars aligned end-to-end in an axial direction of the steel bars while moving the steel bars in the axial direction. The method comprises a moving step of moving the steel bars in the axial direction with a moving device moving the steel bars, a detecting step of using an urging device provided downstream or in the middle of the moving device to urge one steel bar of the plurality of steel bars in a radial direction of the one steel bar when the one steel bar arrives at the urging device while moving in the axial direction so that an end of the one steel bar is displaced in the radial direction relative to an end of another steel bar adjacent to the one steel bar, and of detecting the end of the one steel bar or the end of the another steel bar with a detecting device, and a surface-treating step of locally forming a surface-treated portion on each of the steel bars with a surface-treating device at a surface-treating timing determined on the basis of the result of detection by the detecting device.

In addition, the present invention provides a surface-treated component manufacturing apparatus locally applying surface treatment to a plurality of steel bars aligned end-to-end in an axial direction of the steel bars while moving the steel bars in the axial direction. The apparatus comprises a moving device moving the steel bars in the axial direction, an urging device provided downstream or in the middle of the moving device to urge one steel bar of the steel bars in a radial direction of the one steel bar so that an end of the one steel bar is displaced in the radial direction relative to an end of another steel bar adjacent to the one steel bar, a detecting device detecting the end of the one steel bar displaced in the radial direction by the urging device or the end of the another steel bar, and a surface-treating device locally forming a surface-treated portion on each of the steel bars at a surface-treating timing determined on the basis of the result of detection by the detecting device.

According to the present invention, when surface treatment is to be locally applied to a plurality of steel bars axially aligned end-to-end while axially moving the steel bars, it is possible to surely detect an end (end portion or end face) of each steel bar and hence possible to improve productivity.

DETAILED DESCRIPTION OF EMBODIMENTS

A surface-treated component manufacturing method and apparatus according to an embodiment of the present invention will be explained below in detail with reference to FIGS. 1 to 7 by way of an example in which quenching is applied as surface treatment to a rod of a cylinder device.

Figure 1:
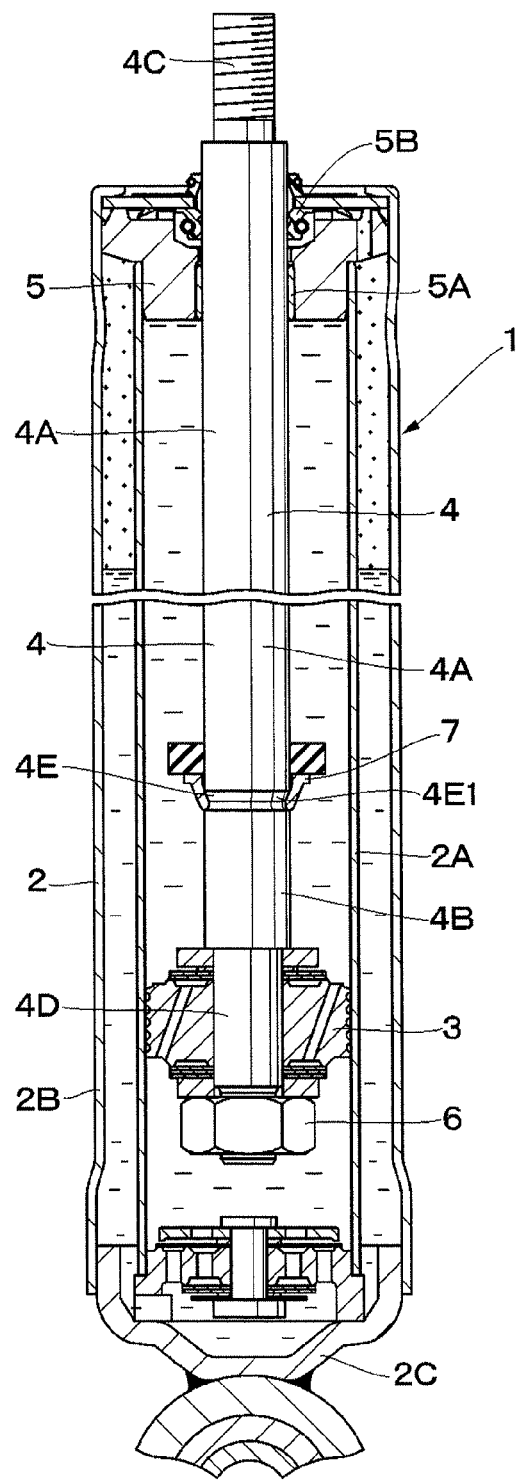
FIG. 1 is a vertical sectional view of a hydraulic shock absorber having a rod according to an embodiment of the present invention.
Figure 2:
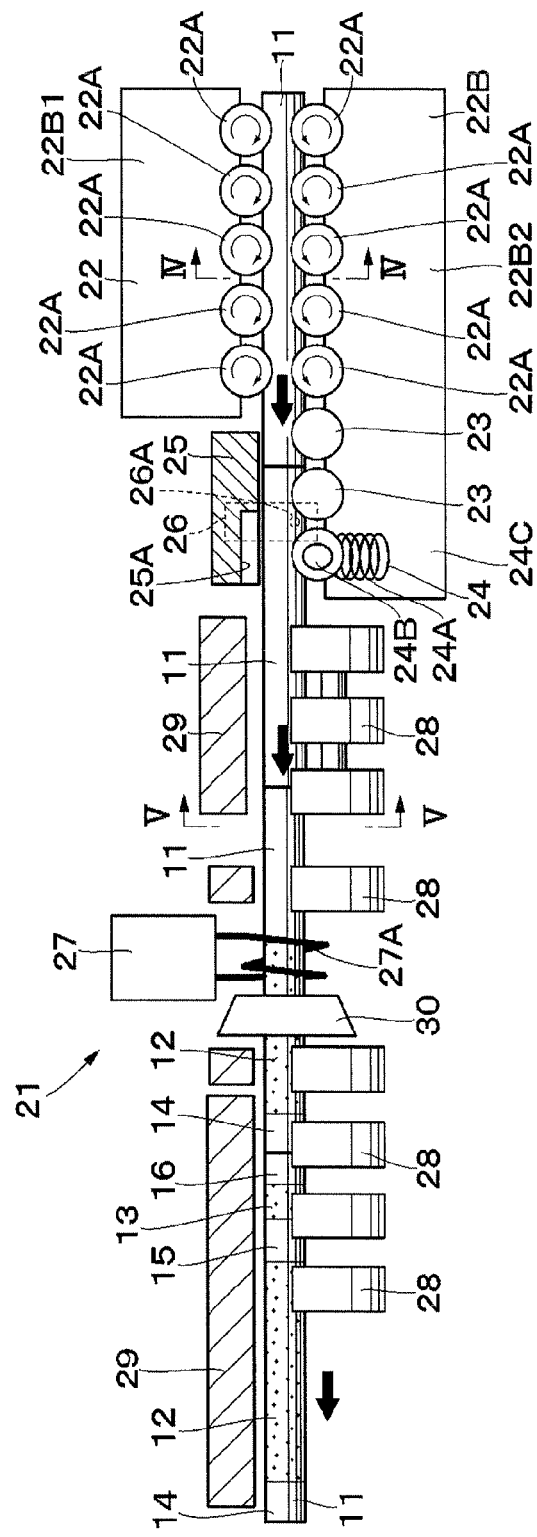
FIG. 2 is a partially-sectioned side view showing a surface-treating apparatus (quenching apparatus) according to the embodiment.
Figure 3:
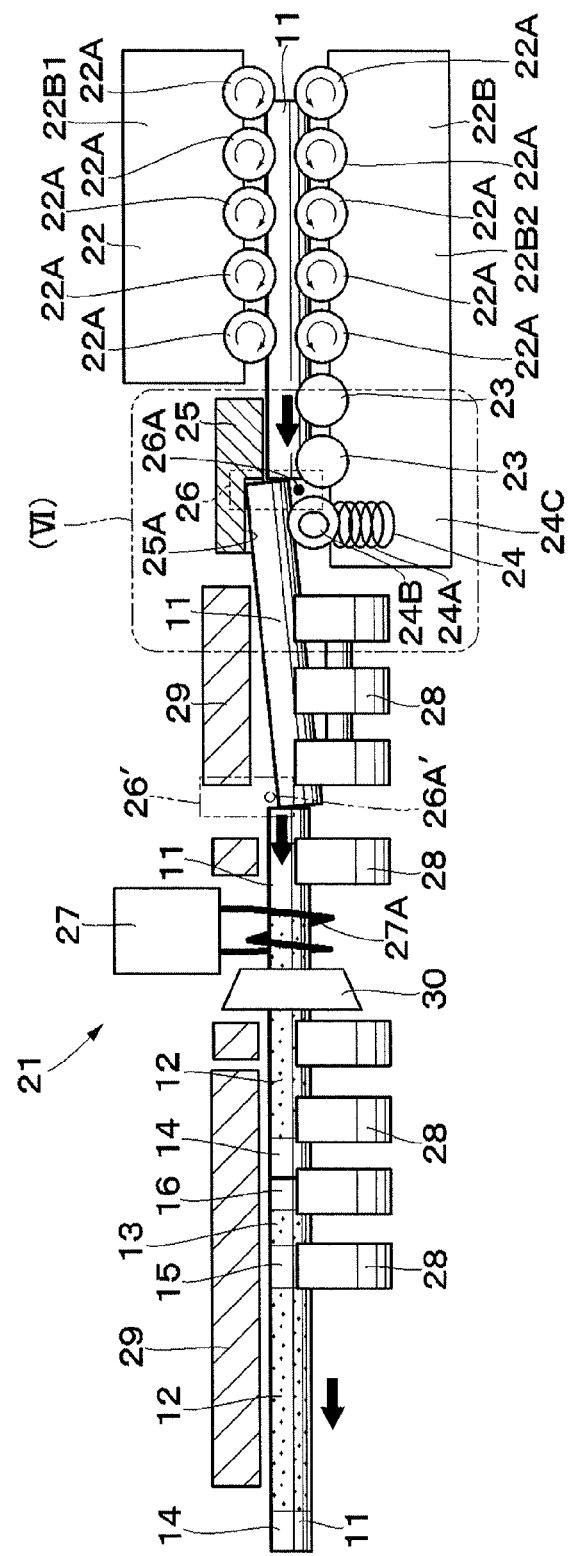
FIG. 3 is a partially-sectioned side view showing the surface-treating apparatus (quenching apparatus), as seen in the same direction as in FIG. 2, when a steel bar is radially displaced by urging of a pressure roller device.

FIG. 1 shows a hydraulic shock absorber 1 having a rod 4 locally subjected to quenching as surface treatment by a surface-treated component (quenched component) manufacturing method and apparatus according to an embodiment of the present invention. The hydraulic shock absorber 1 as a cylinder device substantially comprises a cylinder 2, a piston 3, a rod (piston rod) 4, and a rod guide 5.

The cylinder 2 has a hydraulic fluid sealed therein and is open at one end thereof (upper end in FIG. 1). More specifically, the cylinder 2 has a double-tube structure comprising an inner tube 2A and an outer tube 2B. The bottom of the cylinder 2 is closed with a bottom cap 2C. The piston 3 is axially slidably fitted in the inner tube 2A of the cylinder 2 to divide the interior of the inner tube 2A into two chambers.

The rod (piston rod) 4 as a quenched component (surface-treated component) has one axial end (upper end in FIG. 1) extended to the outside of the cylinder 2 through the opening of the cylinder 2. The other axial end (lower end in FIG. 1) of the rod 4 is connected to the piston 3. The rod guide 5 serving as a supporting member for the rod 4 is provided in the opening of the cylinder 2 to slidingly contact (slide relative to) the rod 4 through a sleeve 5A and a seal ring 5B.

The rod 4 is formed as an elongated circular columnar member (circular columnar bar, or circular cylindrical pipe) extending in an axial direction (vertical direction in FIG. 1). The rod 4 is formed by the following manufacturing method. That is, the rod 4 is formed as a quenched component (surface-treated component) obtained by locally applying quenching treatment (surface treatment) to a steel bar (steel base material) 11 (see FIGS. 2 to 7) made of a steel material, which is solid or hollow and circular (annular) in cross-section. More specifically, the rod 4 is formed by subjecting the steel bar 11 to quenching (high-frequency induction quenching), machining (plastic working, cutting, grinding, polishing, etc.), plating (hard chromium plating), tempering, etc.

The rod 4 has a sliding portion 4A and an intermediate portion 4B corresponding to quenched portions 12 and 13 (described later; see FIGS. 2, 3, 6 and 7), respectively. The rod 4 further has a one-end mounting portion 4C, an other-end mounting portion 4D, and a machined portion 4E corresponding to non-quenched portions 14, 15 and 16 (described later; see FIGS. 2, 3, 6 and 7); respectively. The sliding portion 4A of the rod 4 is a region between the one-end mounting portion 40 and the machined portion 4E. The sliding portion 4A (outer peripheral surface thereof) slidingly contact (moves in sliding contact with) the sleeve 5A and seal ring 5B of the rod guide 5 as the hydraulic shock absorber 1 extends and contracts.

The intermediate portion 4B of the rod 4 is a region between the other-end mounting portion 4D and the machined portion 4E. The intermediate portion 4B is located between the piston 3 and a stopper 7 when the hydraulic shock absorber 1 is completed as a finished product. In the embodiment, quenching (local quenching) is applied to the portions of the rod 4 at the axially opposite sides of the machined portion 4E, i.e. the sliding portion 4A and the intermediate portion 4B.

One end (upper end in FIG. 1) of the rod 4 forms a one-end mounting portion 40 having an outer diameter smaller than those of the sliding portion 4A and the intermediate portion 4B. The one-end mounting portion 4C is secured to a vehicle body-side member (not shown) of a vehicle, for example. The one-end mounting portion 4C is a region cut to a reduced diameter and formed with an external thread by cutting or the like; therefore, the one-end mounting portion 4C is not quenched.

The other end (lower end in FIG. 1) of the rod 4 forms an other-end mounting portion 4D having an outer diameter smaller than those of the sliding portion 4A and the intermediate portion 4B. The other-end mounting portion 4D has the piston 3 secured thereto. The piston 3 is prevented from falling off the rod 4 by a nut 6 thread-engaged with the distal end of the other-end mounting portion 4D. The other-end mounting portion 4D is a region cut to a reduced diameter and formed with an external thread by cutting or the like; therefore, the other-end mounting portion 4D is not quenched.

The machined portion 4E of the rod 4 is a region lying between the quenched portions 12 and 13, i.e. between the sliding portion 4A and the intermediate portion 4B. The machined portion 4E is formed with a full-circumferential groove 4E1 by plastic working or cutting; therefore, the machined portion 4E is not quenched. The full-circumferential groove 4E1 is fitted with a stopper (rebound stopper) 7 that abuts against the rod guide 5 when the rod 4 extends to a considerable extent to restrict further extension of the rod 4. The stopper 7 is secured to the full-circumferential groove 4E1 by a joining method, e.g. metal flow joining.

Next, the method of manufacturing the rod 4 of the hydraulic shock absorber 1 will be explained with reference to FIG. 7.

Figure 7:
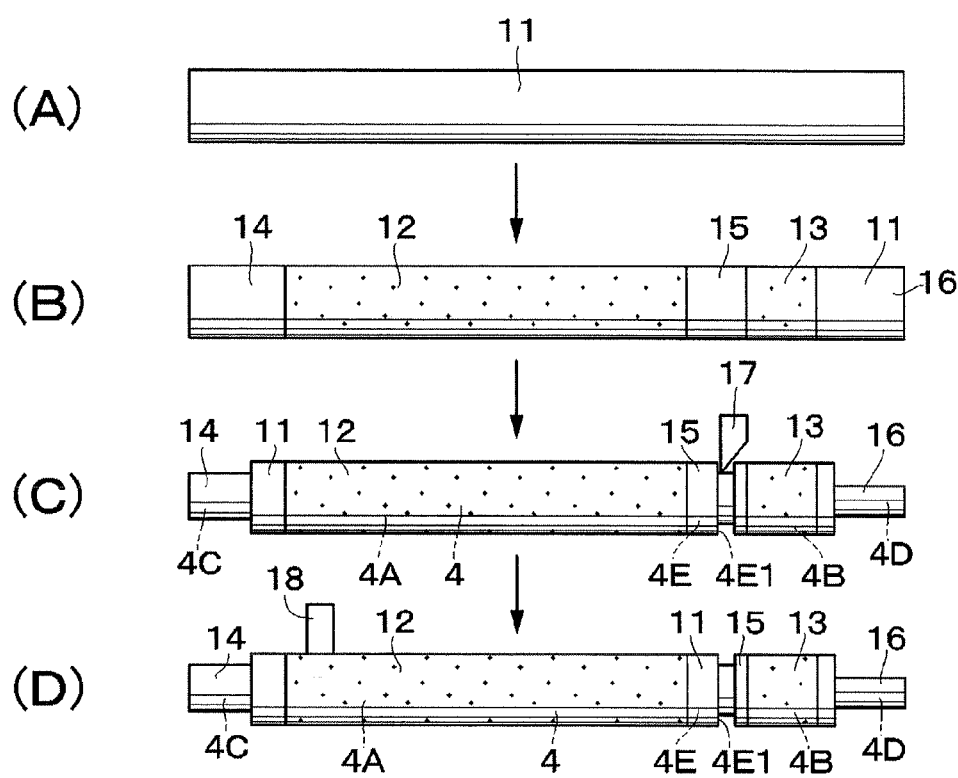
FIG. 7 is a chart showing the steps of manufacturing a rod according to the embodiment in order from the step (A) to the step (D).

The rod 4 shown in FIG. 1 is formed by applying quenching, machining, plating, tempering, etc. to a solid or hollow steel bar 11 cut into a predetermined length as shown in part (A) of FIG. 7. More specifically, the steel bar 11 shown in part (A) of FIG. 7 is formed into the rod 4, as shown in FIG. 1, by being successively subjected to a "quenching step" shown in part (B) of FIG. 7, a "machining step" shown in part (C) of FIG. 7, and a "grinding step" shown in part (D) of FIG. 7, followed by a "plating step", a "tempering step", a "measuring step (inspecting step)", etc., which are not shown in the figure.

In the "quenching step" shown in part (B) of FIG. 7, the steel bar 11 shown in part (A) of FIG. 7 is quenched at two axially spaced portions by high-frequency induction quenching, thereby locally forming quenched portions 12 and 13. Of the two quenched portions 12 and 13, the quenched portion 12, which is closer to one end (left end in FIG. 7), is formed in a region that becomes a sliding portion 4A when the rod 4 is finished. The other quenched portion 13, which is axially separate from the quenched portion 12, i.e. closer to the other end (right end in FIG. 7), is formed in a region that becomes an intermediate portion 4B when the rod 4 is finished. Regions at the opposite sides of the quenched portions 12 and 13, which are surface-treated portions, are non-quenched portions 14, 15 and 16, i.e. non-surface-treated portions, respectively. The non-quenched portions 14, 15 and 16 become a one-end mounting portion 4C, an other-end mounting portion 4D, and a machined portion 4E, respectively, when the rod 4 is finished. It should be noted that the "quenching step" will be detailed later.

After the quenched portions 12 and 13 have been formed at two positions on the steel bar 11 as shown in part (B) of FIG. 7, the "machining step" shown in part (C) of FIG. 7 is performed. In the "machining step", a region of the steel bar 11 lying between the two quenched portions 12 and 13 is subjected to plastic working or cutting to form a full-circumferential groove 4E1. The "machining step" may be carried out, for example, by performing a cutting process in which the full-circumferential groove 4E1 is formed with a cutting tool 17 by using a lathe or the like, or a plastic working process in which the full-circumferential groove 4E1 is formed by pressing a rolling roller (not shown) against the steel bar 11. In this case, the region between the two quenched portions 12 and 13, i.e. the region that becomes a machined portion 4E when the rod 4 is finished, is not quenched (non-quenched portion 15). Therefore, it is possible to easily and stably perform plastic working or cutting for forming the full-circumferential groove 4E1.

Further, in the "machining step" shown in part (C) of FIG. 7, the opposite ends of the steel bar 11 are also subjected to cutting, for example, to reduce the diameter of the end regions, thereby forming a one-end mounting portion 4C and an other-end mounting portion 4D. In this case, the ends of the steel bar 11 are not quenched (non-quenched portions 14 and 16) as in the case of the region where the full-circumferential groove 4E1 is formed. Therefore, it is also possible to easily and stably perform machining for forming the one-end mounting portion 4C and the other-end mounting portion 4D.

After the full-circumferential groove 411, the one-end mounting portion 4C, and the other-end mounting portion 4D have been formed as shown in part (C) of FIG. 7, the "grinding step" shown in part (D) of FIG. 7 is performed. The "grinding step" is performed before the "plating step". That is, prior to the "plating step", grinding or polishing is performed on at least a part of a region to be plated in the "plating step", e.g. a region of the steel bar 11 between the full-circumferential groove 4E1 and the other-end mounting portion 4D. The "grinding step" may be carried out, for example, by performing a grinding process in which the surface of the steel bar 11 is ground with a grindstone 18 by using a grinding machine, or a polishing process in which the surface of the steel bar 11 is polished by using abrasive cloth, paper or grain, or other abrasive material.

Thus, the surface roughness of the region to be plated can be smoothed before the "plating step". Accordingly, it is possible to improve the finish of a coating layer formed in the subsequent "plating step" and to improve the adhesive property (coating strength) of the coating layer. It should be noted that the "plating step", "tempering step", "measuring step (inspecting step)", etc., which follow the "grinding step", are described, for example, in the above-mentioned Japanese Patent Laid-Open Publication No. 2013-209709; therefore, a further explanation thereof is omitted.

Next, the "quenching step", in which the steel bar 11 is locally quenched, will be explained with reference to FIGS. 2 to 6.

FIGS. 2 to 6 show a quenched component (surface-treated component) manufacturing apparatus 21 (hereinafter referred to as simply the "manufacturing apparatus 21") locally quenching (surface-treating) a plurality of steel bars 11 axially aligned end-to-end while axially moving the steel bars 11. The manufacturing apparatus 21 includes a feed roller device 22, a pressure roller device 24, a guide member 25, a detection sensor 26, and a quenching device 27.

The feed roller device (steel bar feed device) 22 as a moving device axially moves steel bars 11 in the axial direction of the steel bars 11. That is, the feed roller device 22 feeds (delivers) steel bars 11 from upstream in the direction of flow of steel bars 11, thereby axially moving a plurality of steel bars 11 axially aligned without a clearance. The feed roller device 22 includes a plurality of rotating rollers (feed rollers) 22A axially feeding steel bars 11, a base 22B rotatably supporting the rotating rollers 22A, and a motor (not shown) rotationally driving the rotating rollers 22A. Here, "without a clearance" will be explained. A steel bar downstream of the rotating roller device 22 is axially moved by a force applied by another steel bar passing the feed roller device 22. Accordingly, the "clearance" is a degree that can transmit the force generated by urging one steel bar with another steel bar adjacent to the one steel bar, and that can axially displace the one steel bar relative to the another steel bar with the urging force from the pressure roller device 24.

Figure 4:
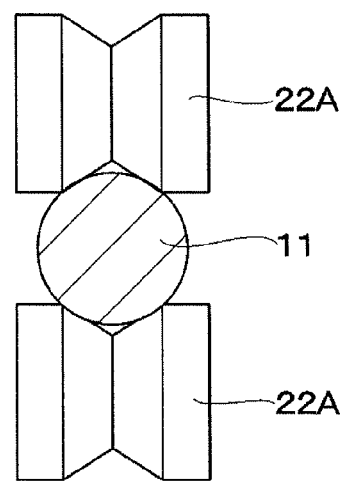
FIG. 4 is an enlarged sectional view as seen from the direction of the arrow IV-IV in FIG. 2.
Figure 5:
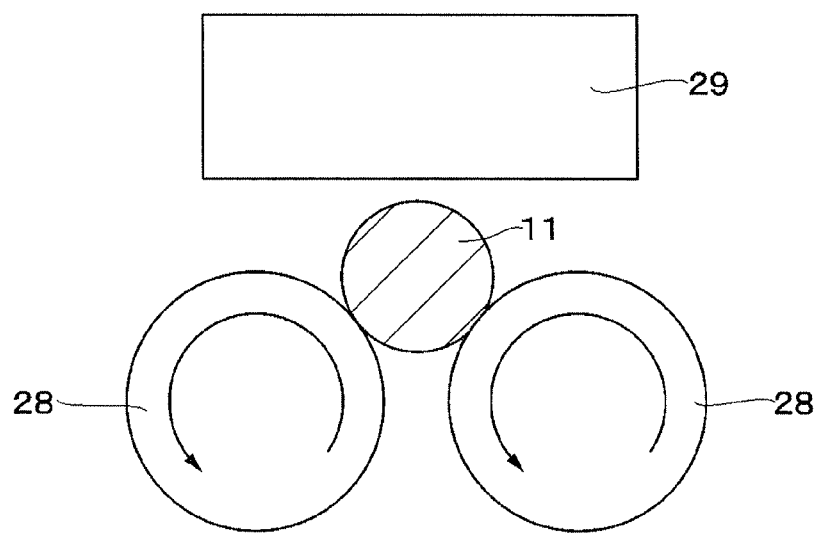
FIG. 5 is an enlarged sectional view as seen from the direction of the arrow V-V in FIG. 2.

The base 22B of the feed roller device 22 is provided with ten (for example) rotating rollers 22A in two (upper and lower) groups of five rotating rollers 22A vertically facing each other. In other words, the base 22B of the feed roller device 22 is provided with five sets of a pair (upper and lower) of rotating rollers 22A, i.e. a total of ten rotating rollers 22A. Thus, the feed roller device 22 axially delivers (pushes out) steel bars 11 by clamping the steel bars 11 from above and below with a plurality of rotating rollers 22A and rotationally driving the rotating rollers 22A with a motor. In this case, each rotating roller 22A is, as shown in FIG. 4, formed as a substantially hourglass-shaped roller which is smaller in diameter at an axially intermediate portion thereof than at the opposite ends thereof.

The base 22B of the feed roller device 22 has an upper roller support part 22B1 located at the upper side of axially moving steel bars 11 to support the upper rotating rollers 22A and a lower roller support part 22B2 located at the lower side of the steel bars 11 to support the lower rotating rollers 22A. In this case, the lower roller support part 22B2 extends more forward in the direction of travel (movement) of steel bars 11 than the upper roller support part 22B1, and the front end of the lower roller support part 22B2 is connected to a base 24C of a pressure roller device 24 (described later).

A portion of the lower roller support part 22B2 that is downstream (forward in the travel direction of steel bars 11) of the rotating rollers 22A is provided with a plurality (two) of follower rollers (idler rollers) 23 located underneath axially moving steel bars 11. The follower rollers 23 guide steel bars 11 fed out from between the vertically facing rotating rollers 22A toward the forward side in the axial direction, i.e. in the travel direction of the steel bars 11. In this case, the follower rollers 23 vertically face a guide member 25 (described later). That is, unlike the rotating rollers 22A, the follower rollers 23 do not face mating rollers. It should be noted that the follower rollers 23 are also formed as substantially hourglass-shaped rollers as in the case of the rotating rollers 22A.

Figure 6:
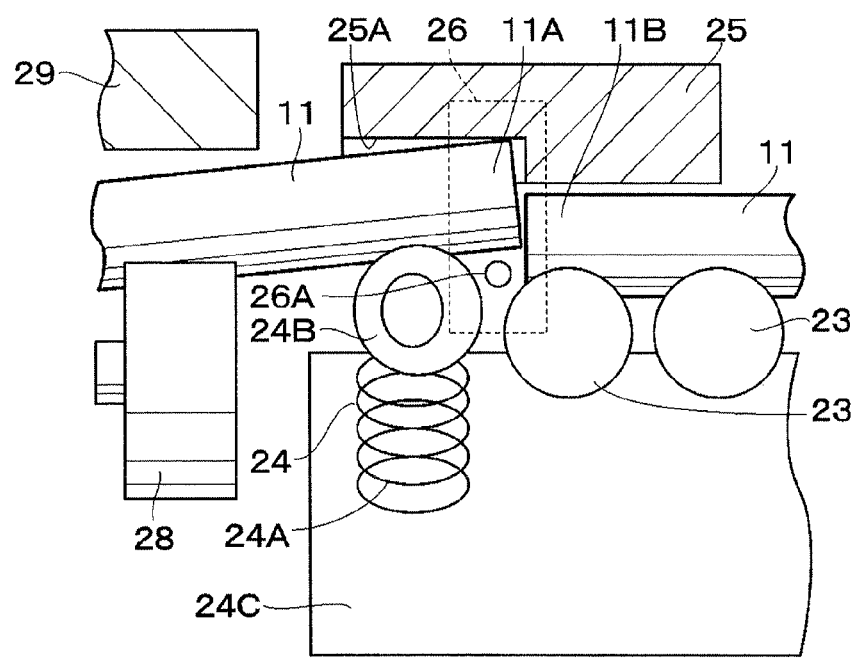
FIG. 6 is an enlarged partially-sectioned side view showing part (VI) in FIG. 3.

The pressure roller device 24 as an urging device is provided downstream of the feed roller device 22. More specifically, the pressure roller device 24 is disposed downstream of the most-downstream rotating rollers 22A of the feed roller device 22 (more precisely, downstream of the most-downstream follower roller 23) to vertically face the guide member 25. As shown in FIG. 6, the pressure roller device 24 radially urges one steel bar 11 passing thereover (facing the pressure roller device 24) to radially displace an end portion 11A of the one steel bar 11 passing (facing) the pressure roller device 24 relative to an end portion 11B of another steel bar 11 adjacent to the one steel bar 11. In the embodiment, the pressure roller device 24 urges the rear side (rear side in the travel direction of steel bars 11; rear or upstream side in the direction of movement) of the one steel bar 11 to rise from the travel direction of the steel bars 11 (to be displaced upward).

Accordingly, the pressure roller device 24 substantially comprises a resilient member 24A made, for example, of a coil spring, a pressure roller 24B pressing the steel bar 11 in the radial direction of the steel bar 11 with the resilient force of the resilient member 24A while guiding the steel bar 11 in the travel direction, and a base 24C supporting the pressure roller 24B through the resilient member 24A.

The base 24C of the pressure roller device 24 is connected to the base 22B of the feed roller device 22, i.e. to the front end of the lower roller support part 22B2. Thus, the base 22B of the feed roller device 22 and the base 24C of the pressure roller device 24 are formed integrally with each other. It should be noted that the pressure roller 24B may be formed as a substantially hourglass-shaped roller as in the case of the follower rollers 23 and the rotating rollers 22A.

The guide member 25 as a guide device is disposed at a position opposite to the pressure roller 24B across the steel bar 11, i.e. at a side toward which the steel bar 11 is pressed by the pressure roller device 24, to face (oppose) the pressure roller device 24 (pressure roller 24B thereof). The guide member 25 guides the steel bar 11 when the latter is displaced in the radial direction thereof.

That is, when the steel bar 11 being axially moved by the feed roller device 22 is released from the clamping by the feed roller device 22, i.e. when the upstream end portion 11A of the steel bar 11 advances downstream of the most-downstream rotating rollers 22A to thereby be released from the clamping by the rotating rollers 22A and further advances downstream of the most-downstream follower roller 23, the rear end (end portion 11A) of the steel bar 11 is raised (displaced upward) by the urging of the pressure roller device 24. The guide member 25 restricts the amount of displacement of the steel bar 11 when radially displaced by the urging by the pressure roller device 24 (i.e. by the pressure by the pressure roller 24B) within a predetermined range (i.e. restricts the steel bar 11 from being radially displaced more than a predetermined amount).

Accordingly, the guide member 25 is formed as a substantially plate-shaped member extending horizontally and has a recess 25A provided at a position facing the pressure roller device 24 so as to abut (receive) against the radially displaced steel bar 11. In this case, the position of the bottom of the recess 25A, which corresponds to the amount of displacement of the steel bar 11, is set so that the steel bar 11 is displaceable to a position where a detection sensor 26 (described later) can detect the presence or absence of an end (end portion 11A or 11B or end face) of a steel bar 11. More specifically, the position of the bottom of the recess 25A may be set so that the steel bar 11 is displaceable until the end portion 11A of the steel bar 11 is brought out of alignment with the detection position of the detection sensor 26 (position facing a detection part 26A) by the urging of the pressure roller device 24.

When steel bars 11 to be quenched are changed to those which are different in diameter and/or length from those quenched so far, the position of the guide member 25 is adjusted according to the dimensions of steel bars 11 to be quenched from now. Thus, it is possible to facilitate set-up change, i.e. setting of the manufacturing apparatus 21 when starting quenching of steel bars 11 different in dimension from those quenched so far.

The detection sensor (detector) 26 as a detecting device is provided between the pressure roller device 24 and the guide member 25. The detection sensor 26 detects the presence or absence of the end (end portion 11A or end face) of the one steel bar 11 radially displaced by the pressure roller device 24 or the end (end portion 11B or end face) of the another steel bar 11. The detection sensor 26 may comprise, for example, a non-contact sensor (e.g. a photosensor, an ultrasonic sensor, a magnetic sensor, etc.) capable of detecting whether or not there is a steel bar 11 at a position facing the detection part 26A.

The detection part 26A is provided, for example, at a position where the detection part 26A does not face (oppose) the end portion 11A of the one steel bar 11 when the end portion 11A is radially displaced by the urging (pressing) of the pressure roller device 24 and where the detection part 26A faces (opposes) the one steel bar 11 when the end portion 11A is not radially displaced. In this case, the detection sensor 26 can detect the fact that the end (end portion 11A or end face) of the one steel bar 11 has passed the detection part 26A when a state where the detection part 26A faces the steel bar 11 has shifted (changed) to a state where the detection part 26A does not face the steel bar 11. Further, the detection sensor 26 can detect the fact that the end (end portion 11B or end face) of the another steel bar 11 has passed the detection part 26A when a state where the detection part 26A does not face the steel bar 11 has shifted (changed) to a state where the detection part 26A faces the steel bar 11. In either case, it is possible to surely detect passage of the end (end portion 11A or 11B or end face) of the one or another steel bar 11.

It should be noted that the detection sensor 26 may be attached to the guide member 25. In this case, various combinations of a detection sensor 26 and a guide member 25 may be prepared for various groups of steel bars 11 to be quenched which are different in diameter, length, etc. from each other. That is, there may be prepared various combinations of a detection sensor 26 and a guide member 25 which have respective positional and dimensional relationships corresponding to various dimensions of steel bars 11 to be quenched. When steel bars 11 to be quenched are changed to those different in dimension from those quenched so far, the guide member 25, together with the detection sensor 26 attached thereto, is changed to another combination of a guide member 25 and a detection sensor 26 appropriate to the dimensions of steel bars 11 to be quenched from now. Thus, it is possible to facilitate set-up change, i.e. setting of the manufacturing apparatus 21 when starting quenching of steel bars 11 different in dimension from those quenched so far.

The detection sensor 26 may, for example, be a non-contact sensor or switch, e.g. a load sensor, which detects the fact that the end portion 11A of the one steel bar 11 has abutted against the recess 25A of the guide member 25. That is, the detection sensor 26 may be any of various sensors and switches capable of detecting the presence or absence of the end (end portion 11A or end face) of the one steel bar 11 or the end (end portion 11B or end face) of the another steel bar 11 (i.e. capable of detecting passage of the end).

Further, in the embodiment, the detection sensor 26 (detection part 26A thereof) is provided at a position corresponding to that end of the one steel bar 11 radially displaced by the urging of the pressure roller device 24, which is at the rear side (side facing opposite to the direction of travel; rear or upstream side in the direction of movement) at which the one steel bar 11 is raised (displaced upward). Alternatively, as shown by the two-dot chain line 26A' in FIG. 3, the detection sensor 26' (detection part 26A' thereof) may be provided at a position corresponding to that end of the one steel bar 11 radially displaced by urging, which is at the forward side (side facing in the direction of travel; forward or downstream side in the direction of movement) at which the one steel bar 11 is lowered (displaced downward). Further, it is also possible to provide detection sensors 26 (detection parts 26A thereof) at respective positions corresponding to the rear and forward ends of the one steel bar 11.

The quenching device 27 as a surface-treating device is provided downstream of the detection sensor 26 in the direction of flow of steel bars 11. The quenching device 27 is, for example, a high-frequency induction quenching device having an induction heating coil 27A surrounding the entire circumference of a steel bar 11. The quenching device 27 determines a quenching timing, i.e. timing of energization (ON) and deenergization (OFF) of the induction heating coil 27A, on the basis of the result of detection by the detection sensor 26, and locally forms quenched portions 12 and 13 on each steel bar 11 at the determined timing.

That is, the quenching device 27 energizes (ON) the induction heating coil 27A when each of regions of a steel bar 11 where quenched portions 12 and 13 are to be formed is passing through the induction heating coil 27A, and deenergizes (OFF) the induction heating coil 27A when each of regions of a steel bar 11 which are to become non-quenched portions 14, 15 and 16 is passing through the induction heating coil 27A. In this regard, the timing of energization and deenergization of the induction heating coil 27A can be set, for example, on the basis of the elapsed time from the time the detection sensor 26 detects the end (end portion 11A or 11B or end face) of the one or another steel bar 11 (i.e. from the time the detection sensor 26 detects passage of the above-mentioned end). The region that can be quenched by the induction heating coil 27A when a steel bar is passing through the induction heating coil 27A is sufficiently short relative to a width of the non-quenched portions 15, 16 and that of the quenched portion 13.

In this case, the timing of quenching performed by the quenching device 27 (i.e. timing of energization and deenergization of the induction heating coil 27A) can be determined on the basis of the result of detection by the detection sensor 26, which is capable of surely detecting the end (end portion 11A or 110 or end face) of the one or another steel bar 11. Therefore, the quenching device 27 can accurately form quenched portions 12 and 13 at desired positions on each of axially moving steel bars 11.

In addition, a combination of circumferentially rotating rollers 28 and a retainer plate 29 is provided at each of the upstream and downstream sides of the quenching device 27, i.e. at each of the forward and rear sides of the quenching device 27 in the travel direction of steel bars 11. The circumferentially rotating rollers 28 circumferentially rotate steel bars 11 moving in the axial direction. The retainer plate 29 blocks steel bars 11 rotated circumferentially by the circumferentially rotating rollers 28 from coming out upward from the circumferentially rotating rollers 28, i.e. guides the circumferentially rotating steel bars 11 in the travel direction-thereof.

In addition, a shower 30 is provided downstream of the quenching device 27 to cool a steel bar 11 having passed through the induction heating coil 27A of the quenching device 27. The circumferentially rotating rollers 28 can circumferentially rotate a steel bar 11 passing through the induction heating coil 27A. Thus, quenched portions 12 and 13 can be formed uniformly over the circumferential direction of the steel bar 11.

It should be noted that the embodiment is arranged such that the urging of the pressure roller device 24 causes the rear side of the one steel bar 11 to be raised (displaced upward) and the forward side of the one steel bar 11 to be lowered (displaced downward). Accordingly, the associated circumferentially rotating roller 28 is disposed to be displaced from a position corresponding to the forward side (forward end) of the one steel bar 11 when the rear side of the one steel bar 11 is raised (radially displaced) by the urging of the pressure roller device 24. Alternatively, the arrangement may be such that only the rear side of the one steel bar 11 is raised, i.e. the forward side of the one steel bar 11 is allowed to advance in the travel direction as it has been doing while only the rear side of the steel bar 11 is radially raised, by disposing the associated circumferentially rotating roller 28 at a position corresponding to the forward side (forward end) of the one steel bar 11 when the rear side of the one steel bar 11 is raised.

In an arrangement wherein both the forward and rear sides of the one steel bar 11 are radially displaced from the travel direction by the urging of the pressure roller device 24 as in the embodiment, the angle of inclination (angle of displacement from the travel direction) of the whole one steel bar 11 with respect to the amount of displacement (amount of radial displacement) of the rear side of the one steel bar 11 can be made larger than in an arrangement wherein the forward side of the steel bar 11 is not displaced (i.e. only the rear side thereof is displaced). Thus, it is possible to improve the reliability of the detection by the detection sensor 26 while suppressing the increase in the amount of displacement (amount of radial displacement) of the rear side of the one steel bar 11. As a result, it is possible to achieve both stable axial movement of a plurality of steel bars 11 and reliable detection.

The following is a manufacturing method using the manufacturing apparatus 21 according to the embodiment having the above-described structure.

The manufacturing method according to the embodiment locally applies quenching as surface treatment to a plurality of steel bars 11 axially aligned end-to-end while axially moving the steel bars 11. The manufacturing method has a moving step, a detecting step, and a quenching step.

In the moving step, the steel bars 11 are axially moved by the feed roller device 22, which moves the steel bars 11. In the moving step, the steel bars 11 are clamped between pairs of rotating rollers 22A (upper and lower rotating rollers 22A) of the feed roller device 22 and, in this state, axially moved through a predetermined section by the rotation of the rotating rollers 22A. Thus, the steel bars 11 advance toward the detection sensor 26 and the quenching device 27.

In the subsequent detecting step, the pressure roller device 24 urges one steel bar 11 arriving at the pressure roller device 24 while moving in the axial direction of the steel bars 11 so that an end portion 11A of the one steel bar 11 is displaced in the radial direction of the steel bar 11 relative to an end portion 11B of another steel bar 11 adjacent to the one steel bar 11, and the detection sensor 26 detects passage of the end (end portion 11A or 11B or end face) of the one or another steel bar 11. In the detecting step, the pressure roller device 24 urges the one steel bar 11 to be displaced in the radial direction thereof, and the guide member 25 guides the one steel bar 11 when the latter is displaced in the radial direction. That is, the one steel bar 11 when radially displaced abuts against the bottom of the recess 25A in the guide member 25, thereby being restricted from being further displaced radially (rising upward).

The above-described detecting step is configured such that the rear side of one steel bar 11 is displaced when the one steel bar 11 is released from the clamping by the feed roller device 22. More specifically, both the forward and rear sides of the one steel bar 11 are radially displaced (forward side is lowered; rear side is raised) from the travel direction by the urging of the pressure roller device 24. Then, the detecting step performs detection of the radially displaced end of the one steel bar 11. More specifically, the detecting step is configured to detect passage of the rear end (end portion 11A or end face) of one steel bar 11 radially displaced by the urging of the pressure roller device 24, or to detect passage of the forward end (end portion. 11B or end face) of another steel bar 11 adjacent to the one steel bar 11.

Thus, passage of the end portion 11A or 119 or end face of the one or another steel bar 11 can be surely detected with the detection sensor 26.

In the subsequent quenching step as a surface-treating step, the timing of quenching (surface-treating) the steel bar 11 is determined on the basis of the result of detection by the detection sensor 26, and quenched portions 12 and 13 are locally formed on the steel bar 11 by the quenching device 27. In this case, the quenching timing is determined on the basis of the result of detection by the detection sensor 26, which is capable of surely detecting passage of the end (end portion 11A or 11B or end face) of the one or another steel bar 11. Therefore, the quenching device 27 can accurately form the quenched portions 12 and 13 at desired positions on the axially moving steel bar 11. Further, as shown in part (C) of FIG. 7, the quenching step is followed by a machining step in which plastic working or cutting is applied to non-quenched portions 14, 15 and 16 of the steel bar 11. Because the non-quenched portions 14, 15 and 16 are left unquenched, machining, e.g. plastic working or cutting, can be performed easily.

Thus, according to the embodiment, when locally quenching a plurality of steel bars axially aligned end-to-end while axially moving the steel bars, it is possible to surely detect (passage of) an end portion 11A or 11B or end face of each steel bar 11 and hence possible to improve productivity.

That is, the embodiment is arranged to detect, with the detection sensor 26, the presence or absence of an end portion 11A or end face of one steel bar 11 radially displaced by the pressure roller device 24 or an end portion 11B or end face of another steel bar 11 adjacent to the one steel bar 11 among a plurality of steel bars 11 axially moving in end-to-end axially aligned relation. Accordingly, it is possible to surely detect passage of the end portion 11A or 11B or end face of the one or another steel bar 11. Further, the timing of quenching by the quenching device 27 is determined on the basis of the result of detection by the detection sensor 26. Therefore, the quenching device 27 can accurately form quenched portions 12 and 13 at desired positions on each of the axially moving steel bars 11.

As a result, the productivity of rods 4 can be improved. More specifically, it is possible to achieve the following productivity improvements: an increase in productivity (i.e. an increase in production rate) achieved by the axial end-to-end alignment of steel bars 11; a reduction in machining time achieved by omission of a machining step otherwise needed to facilitate the detection of the end portion 11R or 11B of steel bars 11 (e.g. a step of applying chamfering or other machining to the end portion 11A of each steel bar 11); a reduction in percent defective (i.e. an increase in yield) achieved by the fact that the quenched portions 12 and 13 can be accurately formed; and so forth.

According to the embodiment, the moving step is configured to move steel bars 11 through a predetermined section with the feed roller device 22 having pairs of rotating rollers 22A by clamping the steel bars 11 between the pairs of rotating rollers 22A. In this case, a plurality of steel bars 11 axially aligned end-to-end can be stably moved in the axial direction by the pairs of rotating rollers 22A.

According to the embodiment, the detecting step is configured to displace a steel bar 11 in the radial direction of the steel bar 11 by the urging of the pressure roller device 24 and to guide the steel bar 11 with the guide member 25 when the steel bar 11 is radially displaced. In this case, the steel bar 11 can be stably displaced in the radial direction by the pressure roller device 24. In addition, the radially displaced steel bar 11 is guided by the recess 25A of the guide member 25, thereby making it possible to stably detect, with the detection sensor 26, the presence or absence of an end (end portion 11A or 11B or end face) of one steel bar 11 or another steel bar 11 adjacent thereto.

According to the embodiment, the detecting step is configured to displace the rear side of the one steel bar 11 when released from the clamping by the feed roller device 22. That is, the rear side of the one steel bar 11 is displaced radially from the axial direction, which is the travel direction of the steel bars 11, by the urging of the pressure roller device 24. Accordingly, the one steel bar 11 can be stably displaced radially while being moved in the travel direction.

The embodiment is arranged to detect the radially displaced end (end portion 11A or end face) of the one steel bar 11. That is, the embodiment is arranged to detect the rear end (end portion 11A or end face) of the one steel bar 11 radially displaced by the urging of the pressure roller device 24. Accordingly, it is possible to improve the reliability of detection of the end portion 11A or end face of the one steel bar 11 by detecting, with the detection sensor 26, the presence or absence of the rear end (end portion 11A or end face) of the one steel bar 11 (i.e. detecting whether or not the rear end has passed the detection sensor 26).

The embodiment is arranged to execute, after the quenching step, the machining step of applying plastic working or cutting to the non-quenched portions 14, 15 and 16 of the steel bar 11. In this case, because the non-quenched portions 14, 15 and 16 are left unquenched, plastic working or cutting can be performed easily.

According to the embodiment, the feed roller device 22 is configured to clamp steel bars 11 from above and below with a plurality of rotating rollers 22A. In this case, a plurality of steel bars 11 can be stably moved in the axial direction by a plurality of rotating rollers 22A clamping the steel bars 11 from above and below.

According to the embodiment, the detection sensor 26 is attached to the guide member 25, which guides a steel bar 11 when displaced radially. Therefore, it is possible to facilitate setting (set-up change) of the manufacturing apparatus 21 when starting quenching of steel bars 11 different in dimension from those quenched so far.

Figure 8:
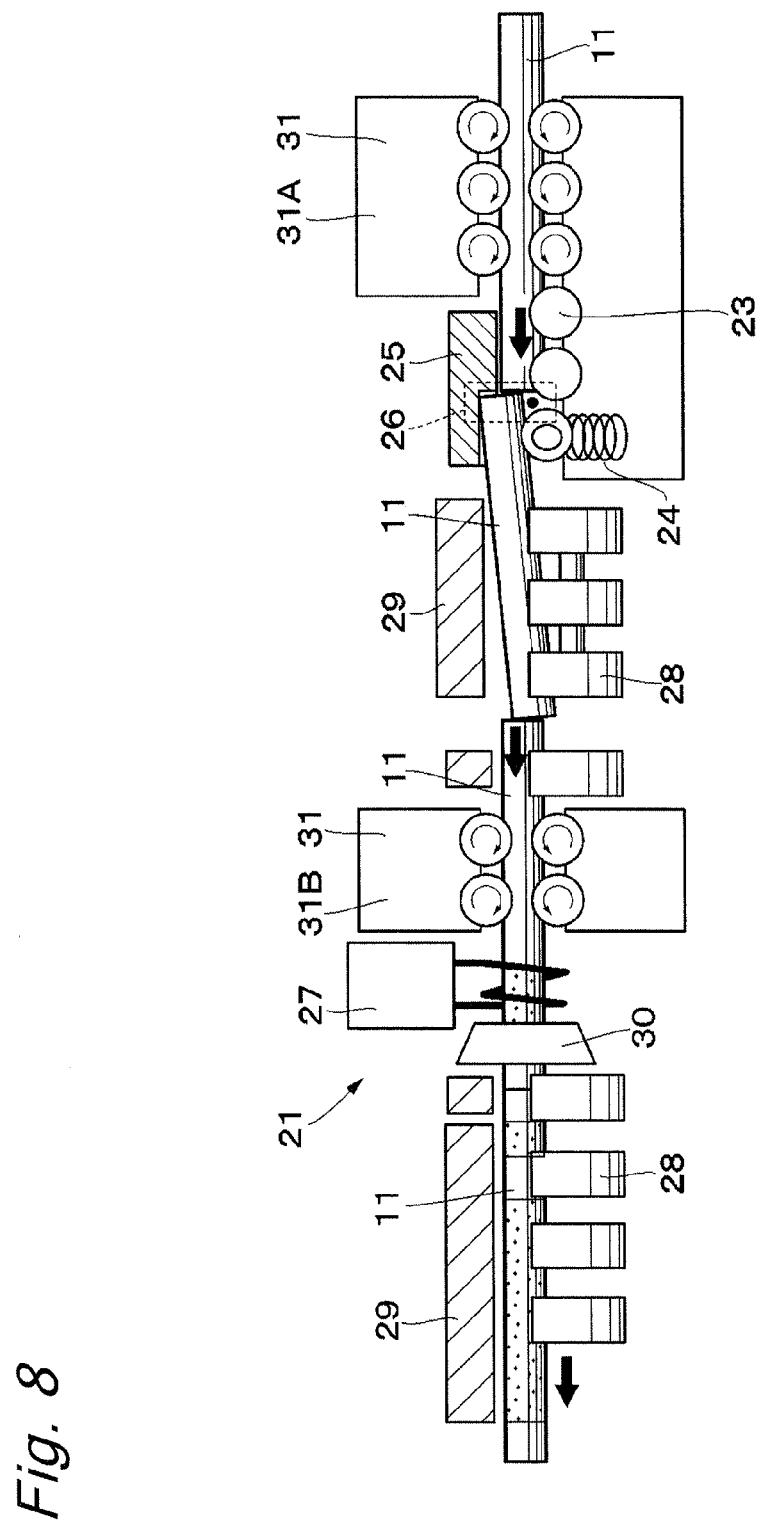
FIG. 8 is a partially-sectioned side view showing a surface-treating apparatus (quenching apparatus) according to a modification of the present invention.

It should be noted that, in the foregoing embodiment, the present invention has been explained by way of an example in which the pressure roller device 24 as an urging device is provided downstream of the feed roller device 22 as a moving device. However, the present invention is not limited to the described structure. For example, as in a modification shown in FIG. 8, a feed roller device 31 as a moving device may comprise two (a plurality of) separated (divided) sections, i.e. an upstream section 31A and a downstream section 31B, and the pressure roller device 24 may be provided in the middle of the feed roller device 31 (i.e. between the upstream section 31A and the downstream section 31B).

In the foregoing embodiment, the present invention has been explained by way of an example in which the feed roller device 22 as a moving device is configured to clamp steel bars 11 from above and below with a plurality of rotating rollers 22A. However, the present invention is not limited to the described structure. For example, the moving device (feed roller device) may be configured to clamp steel bars laterally (from the left and right sides, for example) with a plurality of rotating rollers. The same is the case with the modification.

In the foregoing embodiment, the present invention has been explained by way of an example in which quenching is applied as surface treatment to two positions on each steel bar 11 (i.e. quenched portions 12 and 13 are formed at two positions), but the present invention is not limited thereto. Quenching may be applied to one position on each steel bar (e.g. a quenched portion may be formed between non-quenched portions formed at the opposite ends of the steel bar). Alternatively, quenching may be applied to three or more positions on each steel bar. The same is the case with the modification.

In the foregoing embodiment, the present invention has been explained by way of an example in which the steel bars 11 are circular in cross-section, but the present invention is not limited thereto. For example, the cross-sectional configuration of the steel bars may be quadrangular or polygonal other than circular. The same is the case with the modification.

In the foregoing embodiment, the present invention has been explained by way of an example in which the urging of the steel bar 11 by the pressure roller device 24 as an urging device is performed by using the resilient force of the resilient member 24A. However, the present invention is not limited to the described structure. For example, the steel bar may be urged by using a gas pressure (gas spring), e.g. air pressure. That is, it is possible to use any of various urging devices capable of urging the steel bar in the radial direction thereof. The same is the case with the modification.

In the foregoing embodiment, the present invention has been explained by way of an example in which the steel bar 11 is urged (pressed) through the pressure roller 24B. However, the present invention is not limited to the described structure. The steel bar may be urged directly by an urging device. For example, it is possible to employ a structure in which the steel bar is radially urged by blowing a gas serving as an urging device, e.g. compressed air, directly against the steel bar.

In the foregoing embodiment, the present invention has been explained by way of an example in which the present invention is applied to the rod 4 used in the hydraulic shock absorber 1 as a quenched component. However, the application of the present invention is not limited to the above. For example, the present invention may also be applied to a rod used in other cylinder apparatus, e.g. a hydraulic cylinder. Further, the present invention is applicable not only to rods of cylinder apparatus but also to quenched components incorporated in other machinery, more specifically, applicable to quenched components locally formed with quenched portions.

In the foregoing embodiment, the present invention has been explained by way of an example in which quenching is performed as surface treatment, but the present invention is not limited thereto. For example, the present invention may be applied to a process in which the surface of a component is locally subjected to surface treatment, e.g. plating such as chromium plating, coating, painting, cutting, etc.

According to the foregoing embodiment, when locally applying surface treatment (quenching) to a plurality of steel bars axially aligned end-to-end while axially moving the steel bars, it is possible to surely detect an end (end portion or end face) of each steel bar and hence possible to improve productivity.

That is, the embodiment is arranged to detect, with a detecting device, an end of one steel bar radially displaced by an urging device or an end of another steel bar adjacent to the one steel bar among a plurality of steel bars axially moving in end-to-end axially aligned relation (i.e. detect the presence or absence of the end of the one or another steel bar). Accordingly, it is possible to surely detect the end of the one or another steel bar (e.g. passage of the end). Further, the timing of surface treatment (quenching) by a surface-treating device (quenching device) is determined on the basis of the result of detection by the detecting device. Therefore, a surface-treated portion (quenched portion) can be accurately formed at a desired position on each steel bar moving axially.

As a result, it is possible to improve the productivity of surface-treated components (quenched components) locally subjected to surface treatment (quenching). More specifically, it is possible to achieve the following productivity improvements: an increase in productivity (i.e. an increase in production rate) achieved by axial end-to-end alignment of steel bars; a reduction in machining time achieved by omission of a machining step otherwise needed to facilitate the detection of an end of each steel bar (e.g. a step of applying chamfering or other machining to the end portion of each steel bar); a reduction in percent defective (i.e. an increase in yield) achieved by the fact that surface-treated portions (quenched portions) can be accurately formed; and so forth.

According to the embodiment, the moving step is configured to move steel bars through a predetermined section with a moving device having a pair of rotating rollers by clamping the steel bars between the pair of rotating rollers. In this case, a plurality of steel bars axially aligned end-to-end can be stably moved in the axial direction by the pair of rotating rollers.

According to the embodiment, the detecting step is configured to displace a steel bar in the radial direction of the steel bar by urging the steel bar with the urging device and to guide the steel bar when radially displaced by using a guide device. In this case, the steel bar can be stably displaced in the radial direction by the urging device. In addition, the radially displaced steel bar is guided by the guide device, thereby making it possible to stably detect, with the detecting device, an end of one steel bar or another steel bar adjacent thereto (i.e. detect the presence or absence of the end of the one or another steel bar).

According to the foregoing embodiment, the detecting step is configured such that, when the one steel bar is released from the clamping by the moving device, the rear side of the one steel bar is displaced. More specifically, the rear side (rear side in the travel direction; rear or upstream side in the direction of movement) of the one steel bar is radially displaced from the axial direction, which is the travel direction of the steel bars, by the urging of the urging device. Accordingly, the one steel bar can be stably displaced radially while being moved in the travel direction.

According to the embodiment, the radially displaced end of the one steel bar is detected. That is, the embodiment is arranged to detect the rear end (rear end in the travel direction; rear or upstream end in the direction of movement) or forward end (forward end in the travel direction; forward or downstream end in the direction of movement) of the one steel bar radially displaced by the urging of the urging device. Accordingly, it is possible to improve the reliability of detection of the end of the steel bar by detecting, with the detecting device, the presence or absence of the rear end or forward end of the steel bar (i.e. by detecting whether or not the rear or forward end has passed the detecting device). In this case, the reliability of detection can be further improved by performing detection of the presence or absence of both the rear end and the forward end.

According to the embodiment, the surface-treating step (quenching step) is followed by a machining step of applying plastic working or cutting to a non-surface-treated portion (non-quenched portion) of the steel bar. In this case, because the non-surface-treated portion (non-quenched portion) is left unsubjected to surface treatment (quenching), plastic working or cutting can be performed easily.

According to the embodiment, the moving device is configured to clamp a steel bar from above and below with a plurality of rotating rollers. In this case, a plurality of steel bars can be stably moved in the axial direction by the plurality of rotating rollers clamping the steel bars from above and below.

According to the embodiment, the moving device is configured to clamp a steel bar laterally with a plurality of rotating rollers. In this case, a plurality of steel bars can be stably moved in the axial direction by the plurality of rotating rollers clamping the steel bars laterally.

According to the embodiment, the detecting device is attached to a guide device guiding a steel bar when displaced radially. Therefore, it is possible to prepare various combinations of a detecting device and a guide device for various groups of steel bars to be subjected to surface treatment (quenching) which are different in diameter, length, etc. from each other. That is, it is possible to prepare various combinations of a detection sensor and a guide member which have respective positional and dimensional relationships corresponding to various dimensions of steel bars to be surface-treated (quenched). When steel bars to be subjected to surface treatment (quenching) are changed to those different in dimension from those surface-treated (quenched) so far, the guide device, together with the detecting device attached thereto, is changed to another combination of a guide device and a detecting device appropriate to the dimensions of steel bars to be surface-treated (quenched) from now. Thus, it is possible to facilitate set-up change when starting surface treatment (quenching) of steel bars different in dimension from those surface-treated (quenched) so far.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority to Japanese Patent Applications No. 2014-038852 filed on Feb. 28, 2014. The entire disclosures of No. 2014-038852 filed on Feb. 28, 2014 including specification, claims, drawings and summary are incorporated herein by reference in its entirety.

What is claimed is:

1. A surface-treated component manufacturing method of locally treating at desired positions on respective surfaces of a plurality of steel bars aligned without a clearance in an axial direction of the steel bars while moving the steel bars in the axial direction, the method comprising:
   a moving step of moving the steel bars in the axial direction with a moving device moving the steel bars;
   a detecting step of using an urging device provided downstream or in a middle of the moving device to urge one of the plurality of steel bars in a radial direction of the one steel bar when the one steel bar arrives at the urging device while moving in the axial direction so that an end of the one steel bar is displaced in the radial direction relative to an end of another one of the plurality of steel bars adjacent to the one steel bar, and detecting the end of the one steel bar or the end of the another steel bar with a detecting device by detecting the displacement of the end of the one steel bar in the radial direction, wherein the urging of the urging device does not interrupt the movement of the plurality of steel bars in the axial direction; and
   a surface-treating step of locally forming a surface-treated portion on each of the plurality of steel bars with a surface-treating device at a surface-treating timing determined on a basis of a result of the detection by the detecting device.

2. The surface-treated component manufacturing method of claim 1, wherein the surface treatment is quenching.

3. The surface-treated component manufacturing method of claim 1, wherein the moving step moves the steel bars through a predetermined section with the moving device having a pair of rotating rollers by clamping the steel bars between the pair of rotating rollers.

4. The surface-treated component manufacturing method of claim 1, wherein the detecting step displaces the one steel bar in the radial direction by urging of the urging device and guides, with a guide device, the one steel bar when displaced in the radial direction.

5. The surface-treated component manufacturing method of claim 1, wherein the detecting step displaces a rear end of the one steel bar when the one steel bar is released from clamping by the moving device.

6. The surface-treated component manufacturing method of claim 1, wherein the detecting step detects the end of the one steel bar displaced in the radial direction.

7. The surface-treated component manufacturing method of claim 1, wherein the surface-treating step is followed by a machining step of applying plastic working or cutting to a non-surface-treated portion of each of the steel bars.

* * * * *